United States Patent

Blackwell et al.

[15] 3,704,453

[45] Nov. 28, 1972

[54] CATENATED FILES

[72] Inventors: Wayne Waldo Blackwell, Rockville; John Goodell Earle; John Joseph O'-Connell, both of Gaithersburg; Edwin Bruce Pierce, Damascus; John Edward Shabe, Darnestown, all of Md.

[73] Assignee: International Business Machines Corporation, Armonk, N.Y.

[22] Filed: Feb. 23, 1971

[21] Appl. No.: 117,985

[52] U.S. Cl. ....................340/172.5

[51] Int. Cl. ....................G06f 7/06

[58] Field of Search ....................340/172.5; 235/157

[56] References Cited

UNITED STATES PATENTS

| | | | |
|---|---|---|---|
| 3,432,813 | 3/1969 | Annunziata et al | 340/172.5 |
| 3,376,556 | 4/1968 | Hasbrouck et al | 340/172.5 |
| 3,475,729 | 10/1969 | Porcelli et al | 340/172.5 |
| 3,377,619 | 4/1968 | Marsh et al | 340/172.5 |
| 3,473,156 | 10/1969 | Couleur et al | 340/172.5 |
| 3,340,513 | 9/1967 | Kinzie et al | 340/172.5 |

*Primary Examiner*—Gareth D. Shaw
*Assistant Examiner*—Mark Edward Nusbaum
*Attorney*—Hanifin & Jancin

[57] ABSTRACT

This invention concerns a peripheral control apparatus or channel which controls the transfer of data between input/output devices and a main memory of a data processing system. The channel performs input/output operations when instructed to do so by the data processing system by obtaining control words from a main storage. A plurality of subchannels share a common control section wherein means are provided to selectively combine a plurality of the input/output devices connected to the channel to appear as a single device to the user. This is accomplished by the generation of a plurality of control words from the single control word obtained from main memory and the distribution of logical records of a data set among the plurality of files.

8 Claims, 12 Drawing Figures

INVENTORS
WAYNE W. BLACKWELL
JOHN G. EARLE
JOHN J. O'CONNELL
EDWIN B. PIERCE
JOHN E. SHABE

BY Maurice H. Klitzman
ATTORNEY

CHANNEL STATUS WORD (CSW)

FILE CONTROL WORD (FCW)

CATENATED FILES

BACKGROUND

This invention relates to an apparatus to control the transfer of data to and from a peripheral device of a data processing system and more particularly to an apparatus to control simultaneous data transfer to or from a plurality of such peripheral devices.

Peripheral control devices or channel apparatus are provided in a data processing system to control data transfer between an input/output (I/O) device and the main storage unit of the system. The central processor or CPU of the system may initiate such data transfer by execution of a START I/O instruction in response to which a channel retrieves a channel command word from storage that specifies the type of operation to be performed, the location in storage to or from which the data is to be transferred, and a count indicating the number of units of data to be transferred. Once the CPU has initiated the operation, it is released to return to its own program without further interruption until the transfer has been performed. Such a channel apparatus is disclosed in the King et al. patent, U.S. Pat. No. 3,488,633, assigned to the assignee of the present application. That patent is incorporated in the present patent application by reference.

Channel apparatus operate to control the transfer of segments of data called bytes from a particular selected input/output device, such as a high speed tape unit or a magnetic disk memory unit, assemble such bytes into larger segments referred to as words or double words and, upon completion of the assembly of such a word, initiate a signal to request access to storage which when received allows the assembled word to be transferred to storage. The channel is not provided with continuous access to storage since the CPU, which is operating in parallel with the I/O data transfer, also communicates with the main storage, the CPU operation being suspended only at that time when both the CPU and the channel are simultaneously requesting storage access. By such means, increased data transfer rates, which are normally limited to the maximum data rate of the I/O device, can be achieved.

The above described operation is described as selector or "burst mode" operation because, once the interlocking connection between the channel and the I/O device is obtained across the interface between the I/O device and the channel, that interlock is maintained until the complete data transfer operation has been achieved. When slower input/output devices are employed relatively high data rates may nevertheless be maintained across the I/O interface by employment of what is referred to as the multiplex or byte mode. Channels which operate in this type of mode select a plurality of command words from main storage each of which has to be specified by an instruction from a central processor and each of which is adopted to a control operation of a particular but distinct input/output device. As each channel command word is retrieved from storage, operation of the associated I/O device is initiated by the channel after which each I/O device is selected according to a priority scheme when that I/O device has a byte of data ready for transfer to main storage. If a particular I/O device contains a byte of data which is ready to be transferred, the channel then selects, from storage, the particular channel command word controlling data transfer from that device whereupon the byte of data is transferred over the I/O interface to a buffer register in the channel and to the main storage when access to main storage is obtained. An advantage of this latter type of operation is that with slower types of I/O devices, a plurality of such devices can be put into operation and each one shall transfer a byte of data according to a given priority scheme, the data transfer from various I/O devices being in a multiplex manner to provide transfer at a data rate compatible with the data transfer rates of the faster central processor and main storage of the system with which the slower I/O devices are employed. The data transfer rate of this type device is limited primarily by the data transfer rate of the multiplex channel.

A channel apparatus that contains the capabilities of operating in both the burst and multiplex modes, as well as a combination thereof, in order to more effectively maximize the data transfer rates of all the peripheral devices is shown in the Annunziata, et al. patent, U.S. Pat. No. 3,432,813, which is incorporated in the present patent application by reference.

Although the above channel apparatus have worked admirably they have been restricted to the maximum rate at which a particular selector channel or input/output device could pass data. As a result, if the programmer desired to transfer a large block of data he was restricted to the maximum rate at which a particular selector channel and I/O device could transfer the data or he had to break the data up into segments and individually transfer the data segments over separate selector channels. The latter method required the programmer to provide an instruction for each selector channel involved and, therefore, greatly increased the programmer's bookkeeping requirement.

It is, therefore, an object of the present invention to provide an improved peripheral control apparatus for a data processing system with a high data transfer rate.

It is another object of the present invention to provide an improved peripheral control apparatus for the simultaneous data transfer from a plurality of peripheral devices over separate selector channels.

It is a further object of the present invention to provide an improved peripheral control apparatus for the simultaneous data transfer from a plurality of peripheral devices which appears to the programmer as a single file or device.

It is a still further object of the present invention to provide a peripheral control apparatus which initiates simultaneous operation of a plurality of peripheral devices upon the receipt of a single command.

SUMMARY OF THE INVENTION

Briefly the present invention pertains to a channel apparatus wherein an I/O operation is initiated when the CPU executes an instruction specifying the type of operation. This instruction from the CPU will indicate whether the channel will operate in the normal manner or whether the "catenated" mode is desired. If normal operation is indicated the channel will operate in a manner such as that described in the King, et al. patent, referenced above. If the catenated mode is indicated the channel will operate to allow simultaneous access to four peripheral devices such that it will appear to the programmer that these devices are being operated as a single file facility. Catenation is accomplished by the present invention when the CPU executes an I/O instruction specifying the type of I/O operation and specifying that the operation will be in the catenated mode in the following manner. Upon receipt of a START I/O instruction from the CPU, the channel is directed to enter main storage at a designated location and obtain a channel address word (CAW) which in turn provides the location in main storage of the desired file control word (FCW). The file control word is used to generate psuedo seek and set file mask commands to initialize the four peripheral units involved in the operation. The channel then enters main storage at the next incremented address from that designated by the CAW and obtains the channel command word (CCW). From this initial CCW, four CCW's are created by the channel control unit and stored in the control word storage allocated in the channel. Each of the four resulting CCW's corresponds to one of the four file channels. The four resulting CCW's contain the same command code, flag field, and byte count as the original CCW. However, the data address field of each CCW contains the original CCW data address, plus a multiple of the byte count such that each channel that will be operated simultaneously is directed to a different portion of main memory. This is required to distribute the area of main memory that each of the channels will be either writing into or reading out of. In this way, the individual file channel can transmit/receive date to/from the four different data areas in main memory. Following the generation of the four file control words, the channel control unit initiates and controls data transmission between the four peripheral units and main memory over the selector channels in the normal way.

A feature then of the present invention resides in a channel or I/O operation control unit for a data processing system which unit may be activated by an instruction initiated by the CPU and which unit includes means to modify the command and execute the I/O command on a plurality of peripheral devices simultaneously in such a manner that it appears to the programmer that he is accessing a single file unit.

These and other objects, advantages and features of the present invention will become more readily apparent from the following specification when taken in conjunction with the drawings.

BRIEF DESCRIPTION OF THE DRAWINGS

Referring to FIG. 1, an information processing system of the form contemplated by the present invention includes a main storage unit 10 connected through a suitable bus to a central processing unit, CPU 12. A plurality of switching units 15 individually govern the plurality of connected input/output devices 16. The switching units 15 are connected through an I/O interface bus 17. Each I/O interface bus connects to a channel 14. Channel 14 is connected to the CPU 12 through a CPU interface 20.

Figure 1:
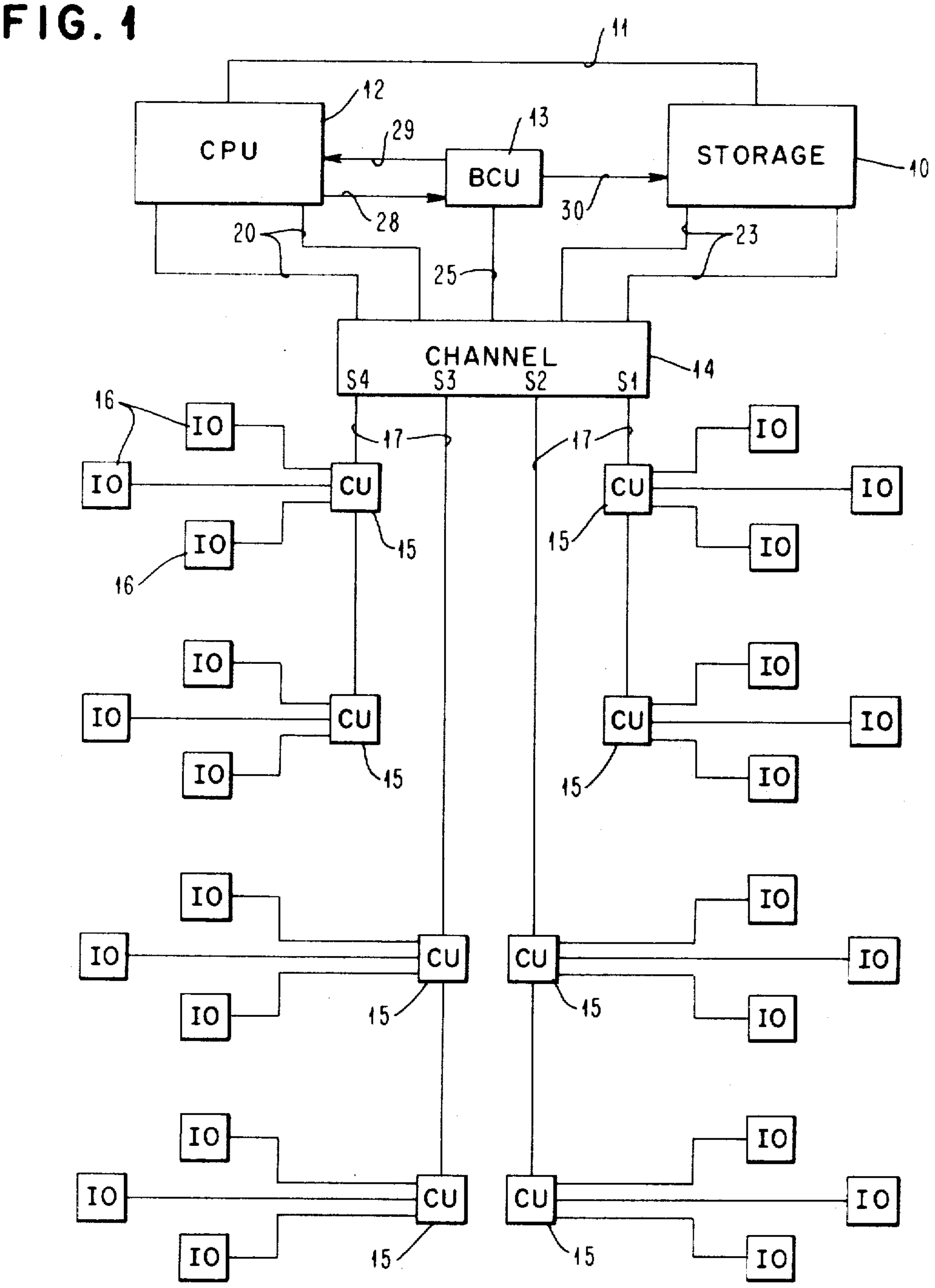
FIG. 1 shows a schematic diagram of a data processing system which employs the present invention.

Each channel unit 14 is connected to the storage unit 10 by way of a storage interface 23 which is operated as a multiplexed bus by a bus control unit 13, described, for example, in IBM Customer Engineering Instruction-Reference-7090 Data Processing System, published 1961 by International Business Machines Corporation, pages 28–44. A bus control interface 25 interconnects channel 14 and bus control unit 13. Completing the bus control unit connections are storage bus 30 and a CPU bus IN 29 and bus OUT 28.

Before describing the general detailed construction and operation of the channel, a description will be provided of the format of the binary code combinations which serve as instructions, commands and control words to initiate the operation of the channel in directing the flow of information between I/O devices and main storage. An instruction is prepared by the CPU and, after decoding, executed by the channel. The instruction may be a START I/O, HALT I/O, TEST I/O, or a TEST CHANNEL. Commands are fetched from memory by the channel when a START I/O instruction is received. Commands, after decoding, initiate the I/O operation. The channel is capable of executing write, read, read backwards, control, sense and transfer in channel commands.

Figure 2:
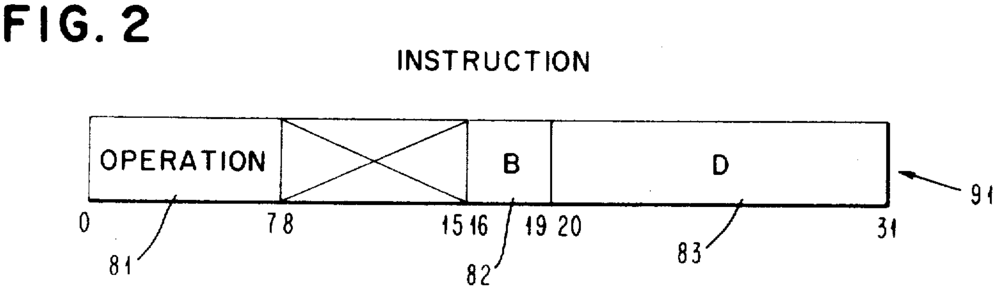
FIG. 2 shows a diagram of the format of the START I/O instruction executed by the CPU to initiate peripheral operation.

Referring to FIG. 2, an instruction format 91 is indicated as comprising 32 binary bit positions. The instruction format comprises an operation code field 81, a B field 82 and D field 83. The operational code is 8 binary bits and may describe START I/O, TEST I/O, HALT I/O and TEST CHANNEL operation. Bit positions 8–15 of the instructions are ignored. The B field 82 comprises four binary bits and the D field 83 comprises 12 binary bits. The 32 bit sum of the D field 83 and the contents of the B field 82 are used to specify the channel an unit address. The high order 16 bits of the sum are translated and the low order 16 bit bits are formulated to provide a 8 bit unit address field and an 8 bit channel address field.

Figure 3:
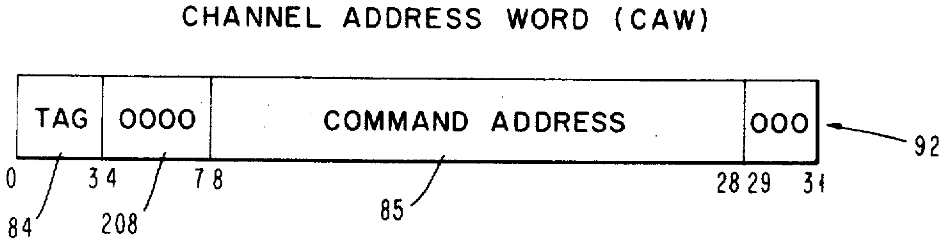
FIG. 3 shows a diagram of the format of the channel address word employed by the present invention to retrieve channel command words.

A START I/O operation directs the channel to enter storage at a designated location and obtain a channel address word (CAW), the format of which is shown in FIG. 3.

Essentially, the CAW 92 is an indirect address providing the location of the desired command. The CAW 92, as indicated in FIG. 3, has 32 binary bit positions including a tag field 84 and a command address field 85. The tag field 84 has four bits which control the access to the memory area in which the I/O operation, i.e., read, write, read backwards, etc., will be performed. The command address field 85 specifies the location of a command control word (CCW) which describes the particular I/O operation to be performed. The bit positions 4–7 and 29–31 must be binary 0's for CAW validity purposes.

Figure 4:
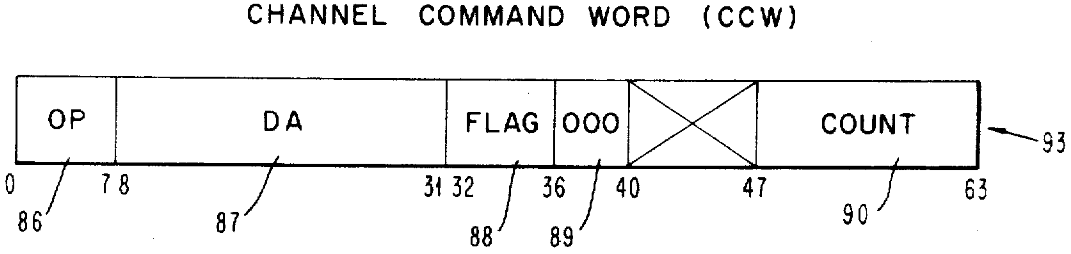
FIG. 4 shows a diagram of the format of the channel command word employed by the present invention.

Referring to FIG. 4, a channel command word (CCW) 93 format of 64 bit positions plus eight parity bits (not shown) includes an operation code field 86 of eight bits; a data address field 87 of 24 bits; a flag field 88 of five bits; a reserve field 98 of three bits; and a count field 90 of 16 bits. The bit positions 40–47 are ignored. The operation code field 86 comprises the operation, i.e., read, write, etc., to be performed. Data address field 87 specifies a storage location in the main storage where the data is to be stored or read. The count field 90 specifies the number of data bytes to be processed. Bit positions 37–39 indicate the validity of the CCW. The flag field 88 comprises a chain data address flag bit, a chain command flag bit, a suppress incorrect length indication flag bit, a skip, and a program control interruption flag bit. When operating in the catenated mode only the suppress length indication flag bit is recognized.

Figure 5:
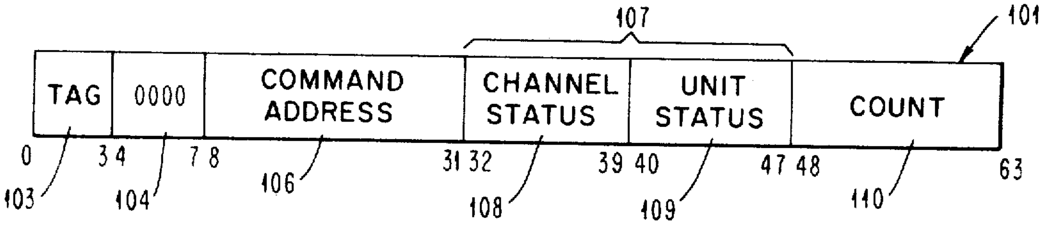
FIG. 5 shows a diagram of the format of the channel status word employed by the present invention.

Referring to FIG. 5, a channel status word (CSW) 101 format comprises a memory tag field 103, a reserve field 104, a command address field 106, a status field in including a channel status field 108 and a unit status field 109, and a count field 110. The CSW provides to the program the status of an I/O device or the conditions under which I/O operations have been terminated. The tag field 103 controls the access to the memory area in which the operation is being performed. The command address field 106 specifies an address that is eight bits higher than the last command address used in the operation being performed. Channel status field 108 describes the status of the channel under which I/O operations were terminated. The unit status field 109 describes the status of the I/O device presently connected to the channel. The conditions indicated by the unit field 109 are attention, control unit end, busy, channel end, device end, unit check and unit exception. Each condition may be modified by the presence of modifier bits. Count field 110 contains the residual count of the last CCW used.

The format of the above described instruction command words as well as the various interfaces between the channel and connecting units (that is, the I/O interface, the CPU-channel interface, and alike) have been designed to accommodate operation according to a particular system architecture in the same manner as described for the channel apparatus of the aforementioned King et al. patent and reference is made thereto for detailed description of these operations. As distinct from the channel of the King et al. patent, the present invention also utilizes another set of control words referred to as file control words (FCW).

Figure 6:
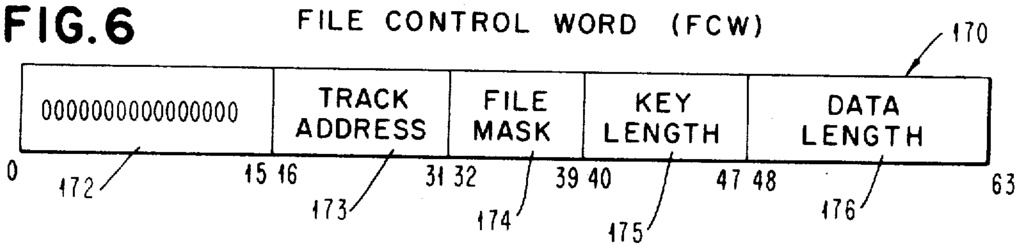
FIG. 6 shows a diagram of the format of the file control word employed by the present invention.

Referring to FIG. 6, a file control word (FCW) 170 format comprises a zero byte field 172, a track address field 173, a file mask field 174, a key length field 175 and a data length field 176. The FCW provides to the channel the information required to generate the set file mask and seek commands for the peripheral devices. The zero byte field 172 contains two bytes of zero. The track address field 173 contains the two byte starting track address on the peripheral files. The file mask field 174 is a one byte tag field which controls the user's access to locations in the peripheral files. The data length field 176 contains a two byte data length indication for the data field on the peripheral devices.

Figure 7:
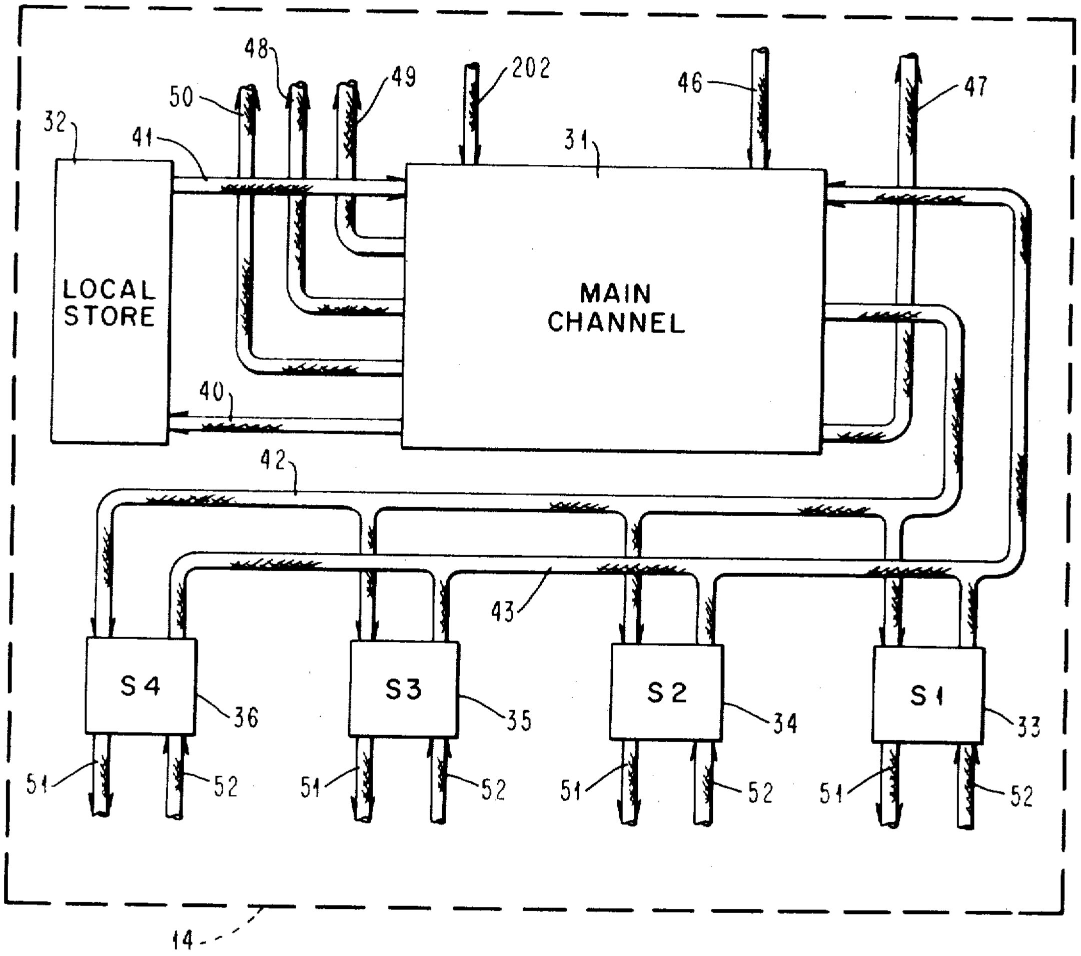
FIG. 7 shows a schematic diagram of the present invention.

The various units of the channel of the present invention are illustrated in FIG. 7 including main channel 31 containing the common data registers and controls, local storage 32 in which the various unit control words are stored, and selector subchannels 33–36. The interconnection between the various units include local storage bus IN 40 and local storage bus OUT 41 between local store and main channel 31, selector subchannel (SSC) bus OUT 42 and selector subchannel (SSC) bus IN 43. Main storage bus OUT 46 and main storage bus IN 47 comprise the channel storage interface 23 of FIG. 1 while storage address bus 48 is a part of the channel-BCU interface 25 of FIG. 1 and unit address bus IN 49, unit address bus OUT 50 and catenation bus OUT 202 are part of channel-CPU interface 20 of FIG. 1. Busses OUT 51 and busses IN 52 to the respective subchannels form a part of the standard I/O interface 17 of FIG. 1.

The present invention is designed to operate with a system, one of the architectural features of which is a standardized data path width of 8 bits which will be referred to hereinafter as a byte. Many data paths will have larger widths which nevertheless in general will be multiples of this unit. The largest width will be 8 bytes or 64 bits. As a practical matter each data path will have an additional parity bit for each byte of data; however, this feature is not pertinent to the present invention and in general will not be discussed.

The various busses described above and to be described below will contain different numbers of conductors or stated differently, the various busses will have different data path widths. The widths of the various data paths can be readily determined from the drawing by observation of registers to which they are connected. For example, in FIG. 8, main storage bus OUT 46 will be observed to have a data path width of 64 bits since it connects to the 64 bit input register 121. Similarly, the bus OUT 42 to the selector subchannels will also have a data path width of 64 since it is connected to data register 122 which contains 64 bits. However, the bus 139 between the input register 121 and the control 120 will be observed to have a data path width of only 8 bits since it is coupled to an 8 bit wide register which is a byte register in the input register 121. The gating circuitry employed to gate the various bytes of data into the respective portions of such registers have not been shown but will be understood to be of the type well known in the art. Such gating will be accomplished at the time of data transfer from one register to another under the control of a clock or synchronizing source (not shown) but may be of a type well known in the art. Normally, this clock will not be in operation but will be started up whenever a START I/O instruction is executed by the CPU or when a service request is initiated by one of peripheral devices under control by the channel.

Figure 8:
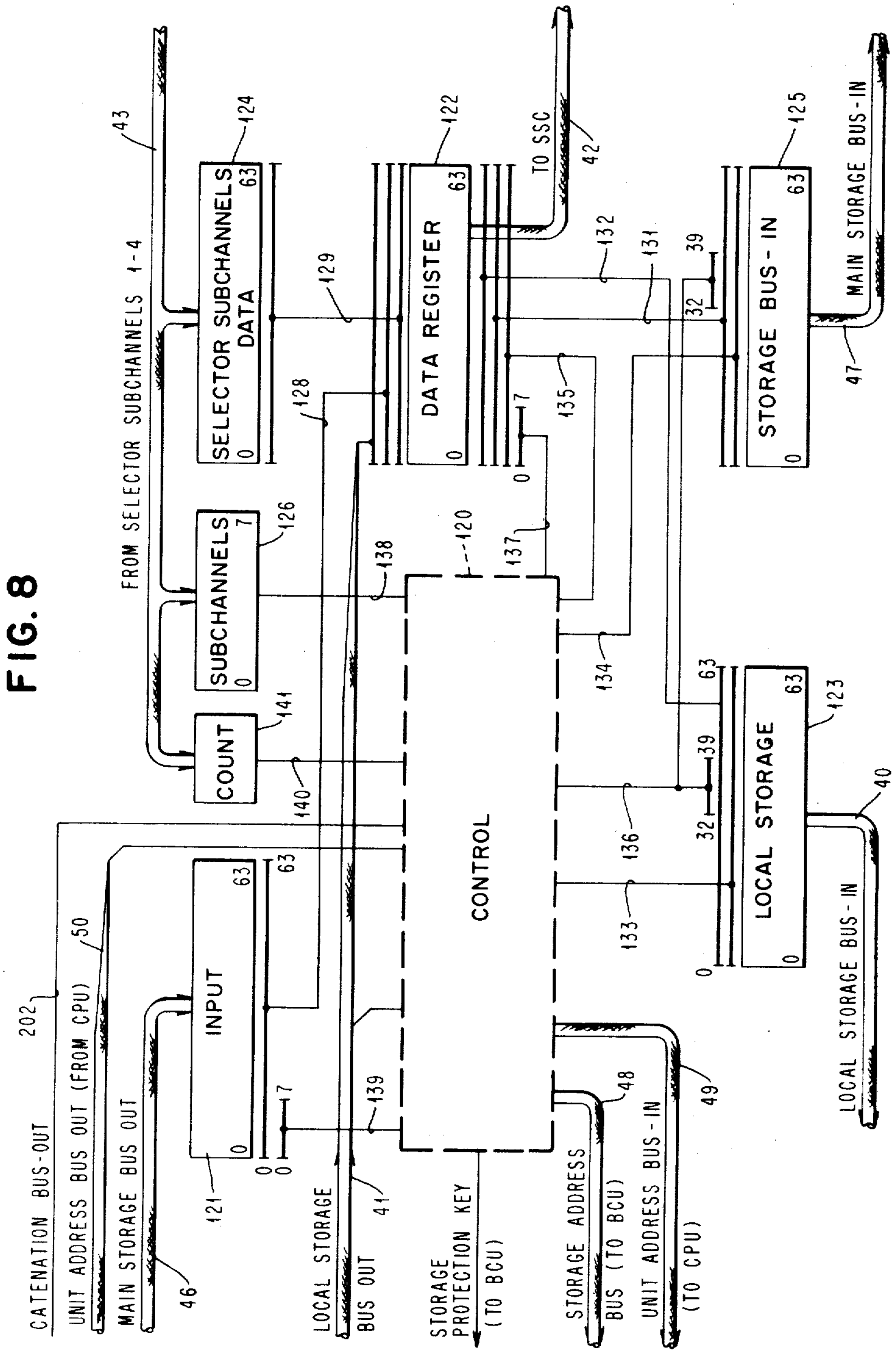
FIG. 8 shows a schematic diagram of the instruction and data flow paths of the present invention.
Figure 9A:
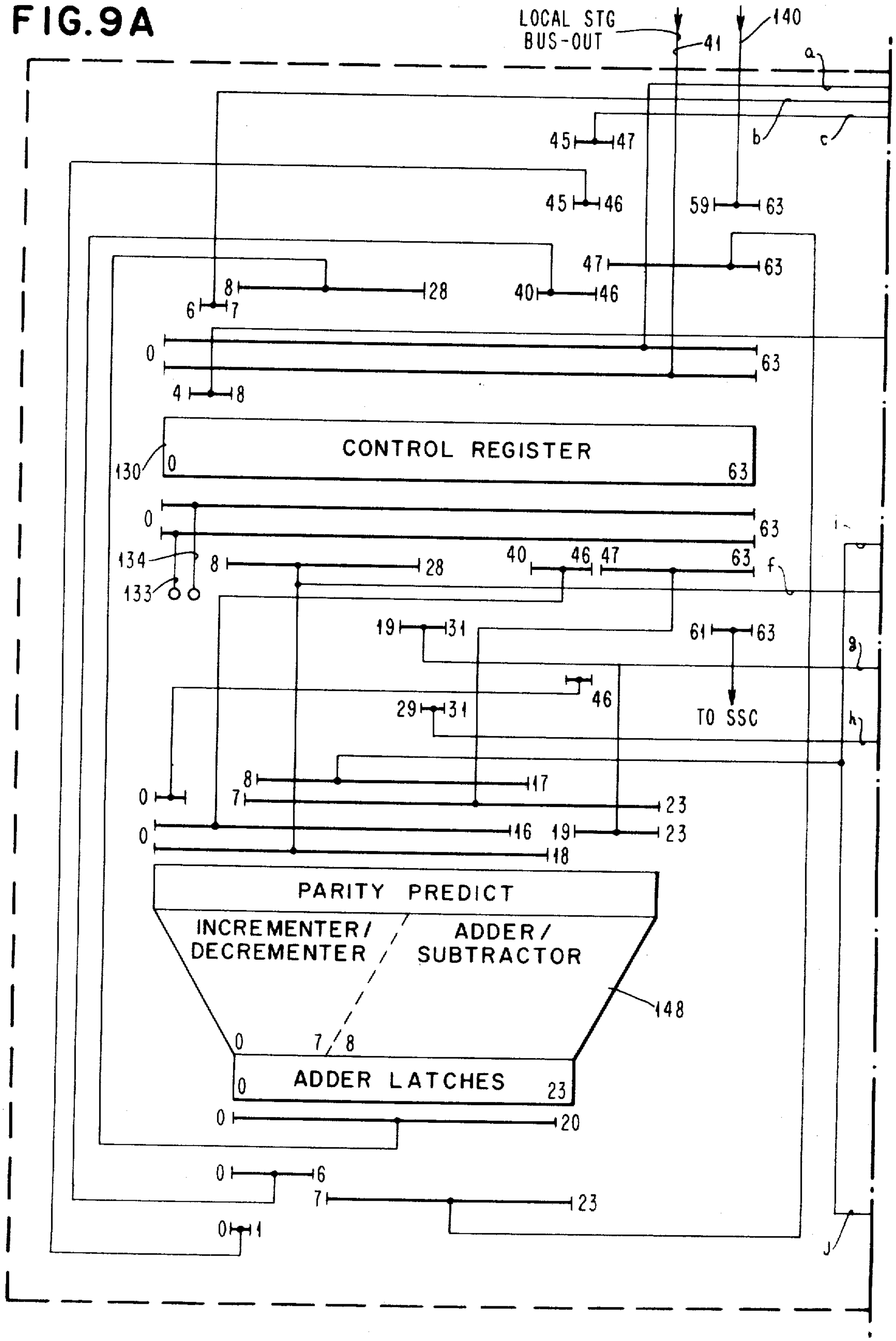
FIGS. 9A and 9B show schematic diagrams of the control circuitry of the present invention.
Figure 9B:
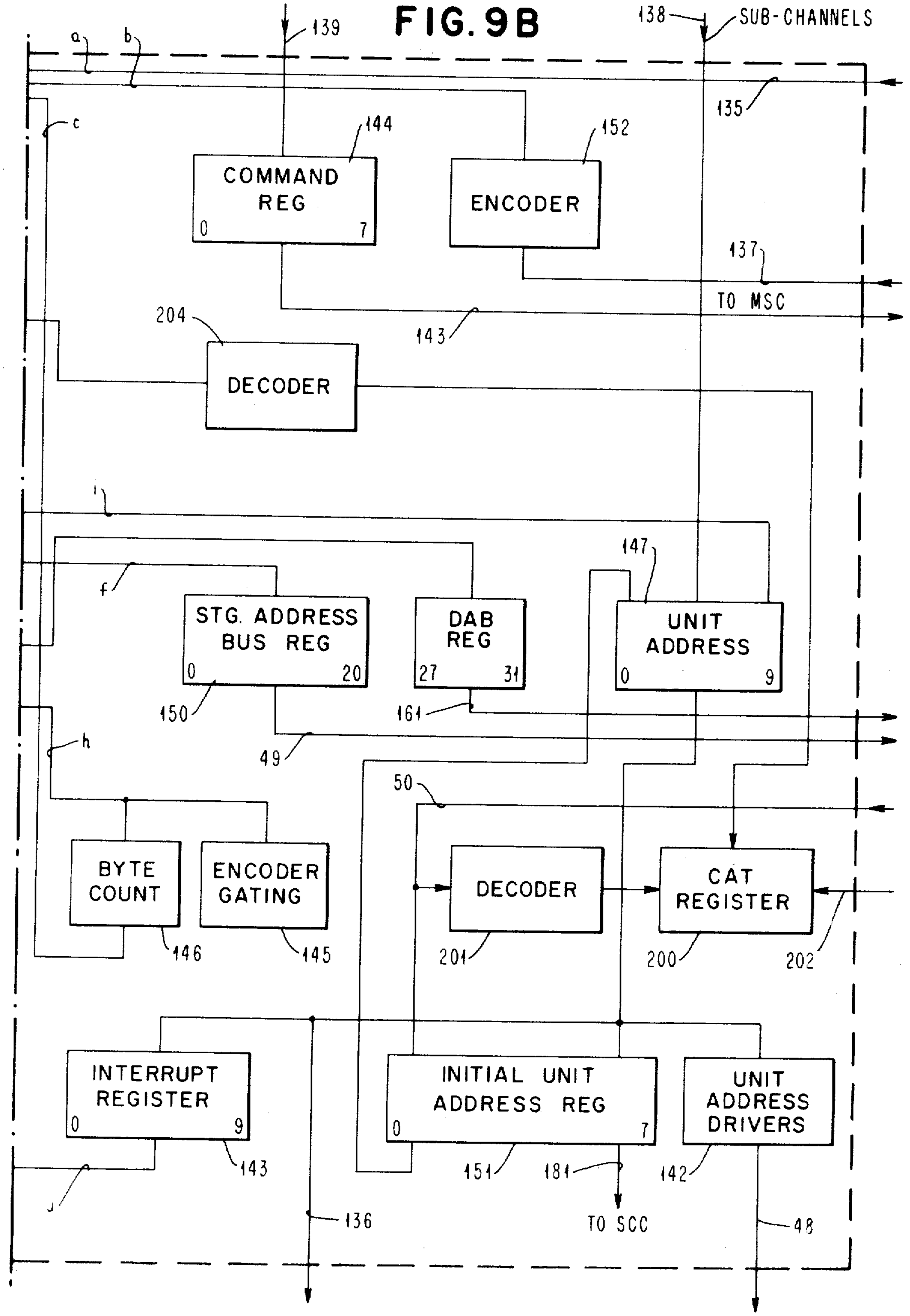

In order to describe the various functions of the units referred to above, as well as the significance of the various fields of the control words, reference is now made to FIG. 8 which is a schematic diagram of the common data paths and registers, and to FIGS. 9A and 9B which constitute a schematic diagram of the control circuitry of the channel. The functions of the registers shown in FIGS. 8, 9A and 9B are essentially those described in the Annunziata patent, referenced above, and the detailed description contained therein is incorporated by reference. The additional components contained in this invention are the decoder 201 which is connected to the unit address bus OUT 50 from the CPU and is used to decode the unit address field 83 to determined whether catenated mode is desired Decoder 204, which is connected to control register 130, is likewise used to decode the zero field 208 of the CAW when it is resident in the control register 130 to determine whether catenated mode is desired. The outputs of decoder 201, decoder 204, and catenation bus OUT 202 from the CPU are all connected to catenation register 200 which indicates when the channel is to operate in catenated mode. Since the common registers and data paths cooperate with the circuitry of the various subchannels, reference from time to time will be also made to FIGS. 10 and 11 which are schematic diagrams of the data paths and control registers of the respective selector subchannels. Detailed description of these devices are also to be found in the Annunziata patent referenced above.

OPERATION

When the CPU executes an instruction of the type illustrated in FIG. 2 where the operation field 81 specifies a START I/O type operation, the particular channel or channels involved are selected according to channel address field 82 and a START I/O line within the CPU interface 20 of FIG. 1 is employed to signal that operation to the channel. The unit address that is obtained from the sum of B field 82 and D field 83 of the instruction, as was described above, is transmitted over unit address bus OUT 50 of interface 20 to control section 120 of FIG. 8 and within this section to initial unit address register 151. The determination by the channel of whether normal channel operation (first mode) or the catenated mode (second mode) is desired may be accomplished in several ways. The first is to provide the unit address, which is obtained from the instruction, to decoder 201 simultaneously with the transfer of the unit address from field 83 into the initial unit address register 151. The unit address is decoded and if catenated mode is desired the decoder 201 places an indication of catenated mode into catenation register 200. Another method is to set the catenation register 200 utilizing a separate signal from the CPU which is transmitted over catenation bus OUT 202, simultaneously with the START I/O instruction from the CPU, to the catenation register 200 to indicate when the catenation mode is desired. Using either of the above methods to indicate when catenation mode is desired, if the catenation register 200 does not indicate that the catenation mode is desired the channel operates in a normal manner or first mode as described in the King, et al. patent, referenced above.

If the catenation register 200 indicates that catenation or second mode is desired, the unit address from field 83 which is in the initial unit address register 151 is transmitted to each of the subchannels to which the peripheral devices designated from catenated mode operation are attached. Unit selection, to be described in detail below, is accomplished for the peripheral files. A fixed storage address is forced onto the storage address bus 48 of FIG. 8 to retrieve the channel address word 92 from main storage. The channel address word 92 is received by input register 121 of FIG. 8 over main storage bus OUT 46 and transferred to data register 122 of FIG. 8 and then to control register 130 of FIG. 9A. Since the channel address word 92 comprises 32 bits plus parity, it occupies bit position 0–31 in the control register 130. It should be noted that determination of whether normal channel operation or catenated mode operation is desired could be delayed and accomplished at this point of the operation. The determination could be accomplished by inserting a catenation bit in the zero field 208 of the channel address word (CAW) 92. When the CAW is fetched into the control register 130 the zero field 208 is decoded by decoder 204 and if catenation mode is desired the decoder 204 places an indication of catenated mode into catenation register 200. The transmission to each of the subchannels of the unit address field 83, described above, would obviously have to be delayed until after the CAW is fetched and the zero field 208 decoded if this method of determining the type operation desired was chosen.

The command address field 85 of the CAW is now transferred to storage address bus register 150 of FIG. 9B and over storage address bus OUT 49 to main storage to retrieve the file control word (FCW) 170. Simultaneously the address field content of control register 130 is transferred to adder 148 to increment the address by 8 (that is, one double word of eight bytes) and back to control register 130. From there the contents of register 130 are transferred to a local storage register 123 of FIG. 8 and to local storage 32 over local storage bus IN 40.

When the file command word (FCW) 170 is received by input register 121 of FIG. 8 from main storage bus OUT 46 it is transferred to data register 122 and then to control register 130 of FIG. 9A. The FCW in input register 121 then generates a seek command using the two bytes of zeros from zero field 172 and a set file mask using the byte in file mask field 174.

The command address field 85 of the CAW is now transferred to storage address bus register 150 of FIG. 9B and over storage address bus OUT 49 to main storage to retrieve the channel command word 93. Simultaneously, the address field contents of control register 130 are transferred to adder 148 to increment the address by eight (that is, one double word of eight bytes) and back to control register 130. From there the contents of register 130 are transferred to a local storage register 123 of FIG. 8 and to that portion of local storage 32 which has been reserved for each of the four peripheral files that have been predetermined to operate in the catenated mode. The contents of register 130 when transferred to local storage 32 will form the first unit control word for the peripheral unit involved.

When the channel command word is received by input register 121 of FIG. 8 from main storage bus OUT 46 it is transferred to data register 122. Means are then provided to generate control words for each of the peripheral devices and to allocate a portion of main storage to each peripheral device. The operation field 86 thereof (see FIG. 4) is transferred to each of the four subchannels and into the peripheral unit involved within each subchannel and also to encoder 152 of FIG. 9B from where the last two bits thereof are transferred to control register 130. The remaining portion of the command word is also transferred to control register 130 with the exception of the first five bits of the operation field which are now replaced by the protection keys of the tag field 84 (see FIG. 3) of the channel address word which have been retained in the control register 130. The contents of the control register are transferred to local storage register 123 of FIG. 8 and to that portion of local storage which has been reserved for the lowest ordered or first subchannel involved in the catenation mode operation to form the second control word for the particular peripheral unit used in the catenation mode. The data address field 87 of the channel command word which has been retained in control register 130 is then transferred to adder 148 where it is incremented by the count field 90. The results of the adder operation are then transferred back to the control register 130 and the contents of the control register are then transferred to local storage register 123 of FIG. 8 and to that portion of the local storage which has been reserved for the second subchannel to form the second control word for the particular peripheral unit involved in the catenation mode operation. This operation of incrementing the data address field 87 of the channel command word is repeated for the third and fourth subchannels involved in the catenation mode operation and the results are stored in the portion of the local storage that is reserved for the third and fourth subchannel, respectively, to form the second control word for the particular peripheral unit associated with these subchannels.

The above described routing will be followed for the selection of each of the peripheral units involved in the catenation mode by the execution of a START I/O instruction which indicates catenation mode by the CPU. Once the peripheral units have been selected on their I/O interface and the various unit control words are stored in local storage, the CPU is released to resume its own program and the channel of the present invention controls the operation of the various peripheral units as will now be described.

After the respective peripheral units have been selected by the main channel as referenced above, they will be in operation, in accordance with generated control words, transmitting data over their respective I/O interfaces one byte at a time under the control of control unit 120. The manner in which the subchannels of the present invention perform unit selection and receive data over the respective I/O interfaces for assembly and transmission to main storage will now be described.

Figure 10:
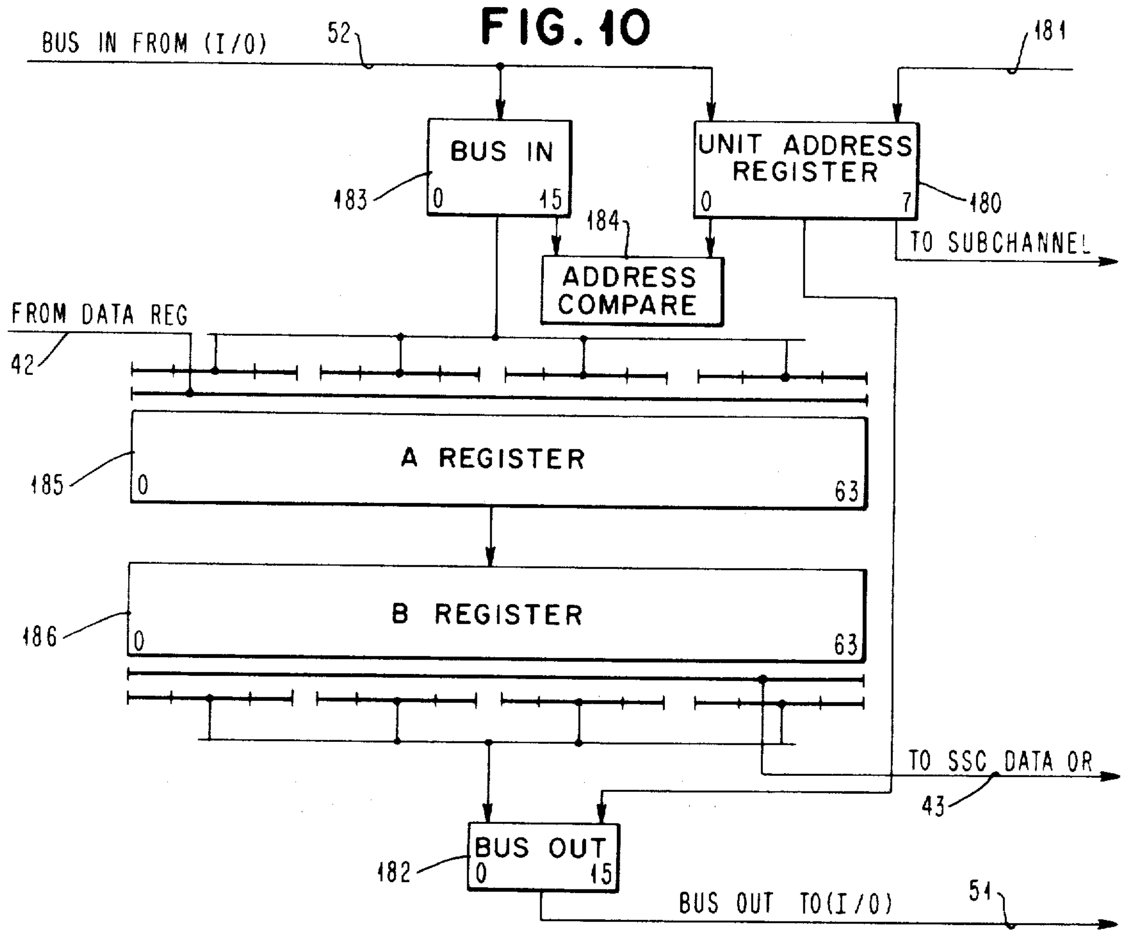
FIG. 10 shows a schematic diagram of a selector subchannel employed in the present invention.
Figure 11:
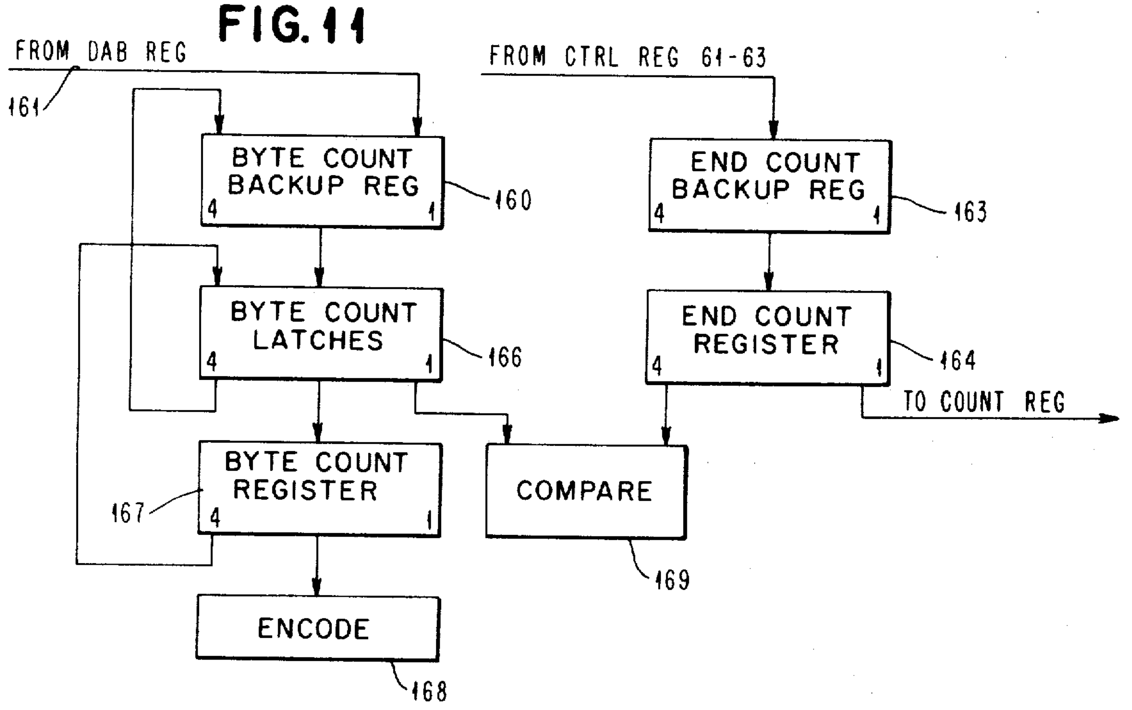
FIG. 11 shows a schematic diagram of the byte and count registers employed by the selector subchannel of the present invention.

Referring now to FIG. 10 which illustrates the data flow path for selector subchannel and to FIG. 11 which illustrates the count register for control of the assembly of the incoming 8-bit bytes into 64 bit words, selector subchannel operation will now be described. During the unit selection operation of the peripheral devices, the device or unit address is received from unit address register 151 of FIG. 9B over bus 181 and placed in unit address register 180 of FIG. 10. It should be noted that this operation is being simultaneously accomplished over each of the subchannels that will participate in the catenation mode operation. From this register the unit address is sent to bus OUT register 182 and transmitted to the selected device over I/O bus OUT 51. When a device acknowledges its acceptance to establish the I/O interlock, it sends its address back over I/O bus IN 52 to bus IN register 183 and if comparison is achieved in address compare unit 184, the operation code is then transmitted to the device as was explained above.

The device then begins to transmit bytes of data over I/O bus IN 52 to bus IN register 183 from where they are gated into one of the 8 byte locations of A register 185. The particular gating circuitry is not shown but will be of the type well known in the art. The initial byte location in A register 185 is determined by the last three bits of the data address field 87 of the channel command word (See FIG. 4). These bits are transferred from control register 130 of FIG. 9A (at the time the channel command word resides in that register) to data address bus register 149 of FIG. 9B and over bus 161 to byte count backup register 160 of FIG. 11. In a similar manner the end count which indicates the last byte position in A register 185 to receive a byte of data is determined by the last three bits of the sum of the data address and count field 90 of the channel command word (see FIG. 4) which are transmitted from control register 130 and end count register 164. The byte count is transmitted from backup register 160 to end count backup register 163 and end count register 164. The byte count is transmitted from backup register 160 to byte count latches 166 to byte register 167 from where it is decoded by encoder 168 to set the appropriate gates to gate data into the particular byte location of A register 185 of FIG. 10. As each byte of data is transmitted from I/O bus IN 52 to A register 185 the byte count is incremented by one and returned to the byte count is incremented by one and returned to the byte count latches 166 for comparison with the comparison of end count register 164. Thus, the A register 185 will be filled with bytes starting with a particular byte location initially specified until the byte count equals zero or the end count as determined by comparator 169 of FIG. 11 at which time the contents of A register 185 of FIG. 10 are transferred to B register 186 and a signal is sent to main channel to request access to data register 122 of FIG. 8. This access is determined by priority circuitry and it will be remembered that the other selector subchannels are also engaged in assembling data bytes and requesting access to the main channel.

When such access is obtained the appropriate until control word for that subchannel is retrieved from local storage over local storage bus OUT 41 to control register 130 of FIG. 9B and the contents of B register 186 of FIG. 10 are transferred over selector subchannel bus 43 to selector subchannel data register 124 of FIG. 8 and to data register 122. At this point access is requested of main storage and the data access field 87 of the command word in register 130 (see FIG. 4) is transferred to storage address bus register 150 of FIG. 9B and over storage address bus 49 to the bus control unit 13 of FIG. 1. When a main storage cycle is obtained the contents of the data register 122 are transferred to storage bus IN register 125 over main storage bus IN 47 to main storage. At this time, the contents of end count register 164 are transferred to count register 141 of FIG. 8 to control register 130; the data address field 87 (see FIG. 4) is transferred from control register 130 to adder 148 where it is incremented by a count of eight and returned to control register 130. The count field 90 of the command word is similarly transferred from control register 130 to adder 148 where it is decremented by a count of eight and returned to control register 130 whereupon the contents of control register 130 are transferred to the local storage register 123 of FIG. 8 and placed back in local storage at the same address from which it is retrieved, this procedure being repeated for each selector subchannel when that subchannel has an assembled word to transfer to main storage.

Upon completion of the transferred by the peripheral devices the channel will interrupt the CPU 12 and upon receiving an interrupt response line, the channel will initiate a storage request and store its own status and the unit status in main storage 10 as described the King, et al. patent, referenced above. Prior to the interruption of the CPU 12 by the channel of this invention, however, since a plurality of peripheral devices are involved, it is necessary to determine the status of all the devices performing the required operations. Means to indicate completion of operation to CPU are provided in the following manner. Upon receipt of the ending status from all devices involved in the catenated mode operation the channel requests an interrupt. Upon receiving an interrupt response line, the channel takes the inclusive OR of the two bytes of status contained in channel status field 108 and the unit status field 109 of the CSW 101 for each of the peripheral units involved and uses the results to form in control register 130, a single CSW 101 to be forwarded and stored in main storage 10.

The above procedures were descriptive of the operation of transferring data from the peripheral devices to main storage. When the operation is to transfer data from the main storage to the peripheral device the procedure will be reserved whereby the whole data word is transferred over main storage bus 47 of FIG. 8 to input register 121 of FIG. 8 and then to data register 122. From there the contents of the data register 122 are transferred over data bus 42 to a register 158 of FIG. 10 and to B register 186 for which the contents are gated out one byte at a time to bus OUT register 182 and over bus OUT 151 to the peripheral device, the selection of the peripheral device and the control of the data transfer being under the control of the unit control word in control register 130 of FIG. 9A which was retrieved from local storage in the same manner as described above for the write-in operation with the respective address fields and count fields being respectively incremented and decremented as was described above for the write-in operation.

While the invention has been particularly shown and described with reference to the preferred embodiment thereof, it will be understood by those skilled in the art that various changes in form and details may be made therein without departing from the spirit and scope of the invention.

What is claimed is:

1. A peripheral control apparatus in a data processing system including a processor, a storage, a plurality of peripheral devices, and said peripheral apparatus which comprises:
   - means for indicating a first mode operation of one of said peripheral devices and a second mode simultaneous operation of a plurality of said peripheral devices;
   - first means connected to said indicating means operable in response to first mode indication for operating said one of the peripheral devices;
   - second means connected to said indicating means operable in response to second mode indication to retrieve from said storage a control word, said second means further including means to generate control words for each of said peripheral devices from said retrieved control word, and means to allocate a portion of said storage to the operation of each peripheral device;
   - means connected to said second means operable in response to said generated control words for causing the simultaneous operation of a plurality of said peripheral devices.

2. A peripheral control apparatus for a data processing system including a central processor having means to execute an instruction, a main storage unit and a plurality of peripheral devices, said peripheral control apparatus comprising:
   - first means connected to said plurality of peripheral devices to operate in a first mode for causing one of said peripheral devices to operate;
   - second means connected to said plurality of peripheral devices to operate in a second mode for causing;
   - said peripheral control apparatus to retrieve from said storage one control word, said second means further including means to generate a control word for each of a designated plurality of said peripheral devices, and means to allocate a portion of said storage unit to the operation of each of said designated plurality of peripheral devices; and
   - means connected to said second means operable in response to said generated control words for causing the simultaneous operation of said designated plurality of said peripheral devices.

3. A peripheral control apparatus in a data processing system including a processor, a storage coupled thereto and a plurality of peripheral devices, said apparatus comprising:
   - means for indicating that simultaneous operation of said peripheral devices is desired;
   - first address means for providing a first storage address to access a storage location in said storage;
   - means responsive to a first command word obtained from said first storage address for selecting and initializing said peripheral devices;
   - means for incrementing first address means to obtain a second storage address to access a storage location in said storage;
   - generator means responsive to a second command word obtained from said second storage address to generate control words for each of said peripheral devices and to allocate a portion of said storage to the operation of each peripheral device;

means operable in response to said generated control words for causing the simultaneous operation of a plurality of said peripheral devices.

4. A peripheral control apparatus as claimed in claim 3 wherein means to allocate a portion of said storage unit consists of an adder for incrementing address field of said retrieved control word.

5. A peripheral control apparatus as claimed in claim 3 further comprising a local storage means connected to said operable means wherein said local storage receives a separate generated control word for each of said plurality of peripheral devices after initiation of data transfers by said devices and said control means retrieves from said local storage the respective generated control word for a selected device when the corresponding device is prepared to transfer data.

6. A peripheral control apparatus in a data processing system including a processor, a storage, a plurality of peripheral devices, and said peripheral control apparatus which comprises:

generator means operable in response to an instruction from said processor for retrieving a control word from said storage and for generating a plurality of control words for each of said plurality of peripheral devices from said one control word;

means to allocate a portion of said storage to the operation of each of said plurality of peripheral devices; and means operable in response to said generated control words for causing the simultaneous operation of said plurality of peripheral devices.

7. A peripheral control apparatus as claimed in claim 6 wherein means to allocate a portion of said storage unit consists of an adder for incrementing address field of said retrieved control word.

8. A peripheral control apparatus as claimed in claim 6 further comprising a local storage means connected to said operable means wherein said local storage receives a separate generated control word for each of said plurality of peripheral devices after the initiation of data transfers by said devices and said control means retrieves from local storage the respective generated control word for a selected device when the corresponding device is prepared to transfer data.

* * * * *